US009426284B2

United States Patent
Prewitt, II et al.

(10) Patent No.: US 9,426,284 B2
(45) Date of Patent: Aug. 23, 2016

(54) METHODS, SYSTEMS, AND COMPUTER READABLE MEDIA FOR CALL FLOW ANALYSIS USING COMPARISON LEVEL INDICATORS

(71) Applicant: Ixia, Calabasas, CA (US)

(72) Inventors: Robert Winn Prewitt, II, Apex, NC (US); Kalyan Sundhar, Cary, NC (US); Martin Robert Mathieson, Wales (GB)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 14/540,005

(22) Filed: Nov. 12, 2014

(65) Prior Publication Data

US 2015/0140956 A1 May 21, 2015

Related U.S. Application Data

(60) Provisional application No. 61/903,925, filed on Nov. 13, 2013.

(51) Int. Cl.
*H04W 24/06* (2009.01)
*H04M 3/36* (2006.01)

(52) U.S. Cl.
CPC .................................. *H04M 3/362* (2013.01)

(58) Field of Classification Search
CPC ...... H04W 24/06; H04W 24/05; H04Q 7/20; G06F 11/00
See application file for complete search history.

(56) References Cited

U.S. PATENT DOCUMENTS

2005/0090243 A1* 4/2005 El Husseini .......... H04W 24/00 455/423
2012/0266024 A1* 10/2012 Jackson ................ G06F 21/577 714/35

OTHER PUBLICATIONS

Ixia,"Triple-Play Network Performance Testing—IxLoad—Overview," http://www.ixiacom.com/products/network_test/applications/ixload/index.php, pp. 1-2 (Aug. 31, 2013).
Ixia, "IxLoad—Solution Brief," http://www.ixiacom.com/products/ixload/index.php, 915-3030-01.D, pp. 1-4 (Feb. 2012).

* cited by examiner

*Primary Examiner* — Myron K Wyche
(74) *Attorney, Agent, or Firm* — Jenkins, Wilson, Taylor & Hunt, P.A.

(57) ABSTRACT

Methods, systems, and computer readable media for call flow analysis using comparison level indicators (CLIs) are disclosed. One exemplary method includes emulating a plurality of user devices, transmitting test traffic to at least one device under test (DUT) using the emulated user devices, receiving traffic from the at least one DUT in response to the traffic transmitted by the emulated user devices, and analyzing the traffic received from the at least one DUT using one or more CLIs, wherein each CLI indicates particular information associated with the traffic to analyze or compare.

20 Claims, 7 Drawing Sheets

| TEST SEQUENCE ID | DIRECTIONALITY | MESSAGE / MESSAGE ID | ATTRIBUTE IDENTIFIER | EXPECTED ATTRIBUTE VALUE | COMPARISON LEVEL INDICATOR |
|---|---|---|---|---|---|
| 1 | EGRESS | RRC CONNECTION REQUEST (A) | | | |
| | | | A-MESSAGE TYPE/OP CODE | X | 1 |
| | | | PARAMETER A-1 | Y | 2 |
| | | | PARAMETERS A-2, A-4, A-6 | R, J, L | 3 |
| 2 | INGRESS | RRC CONNECTION SETUP (B) | | | |
| | | | B-MESSAGE TYPE/OP CODE | Z | 1 |
| | | | LATENCY B | <=E | 4 |
| 3 | EGRESS | RRC CONNECTION SETUP COMPLETE (C) | | | |
| | | | C-MESSAGE TYPE/OP CODE | AA | 1 |
| | | | PARAMETER C-1 | ZZ | 2 |
| | | | PARAMETERS C-3, C-5 | NN, UU | 3 |
| 4 | EGRESS | ATTACH REQUEST (D) | | | |
| | | | D-MESSAGE TYPE/OP CODE | BB | 1 |
| | | | PARAMETER D-1 (EXISTENCE) | TRUE | 2 |
| | | | PARAMETER D-1 | QQQ | 3 |
| 5 | EGRESS | PDN CONNECTIVITY REQUEST (E) | | | |
| | | | E-MESSAGE TYPE/OP CODE | CC | 1 |
| | | | PARAMETER E-1 (EXISTENCE) | FALSE | 2 |

| COMPARISON LEVEL INDICATORS | OCCURRENCES | % OF TOTAL (E.G., 1000) |
|---|---|---|
| - CLI 1 | 7500 | 75% |
| - CLI 2 | 5000 | 50% |
| + CLI 3 | 3500 | 35% |
| + UNDEFINED CLI 3 | 1500 | 15% |
| + UNDEFINED CLI 2 | 2000 | 20% |
| + CLI 4 | 7500 | 75% |
| - UNDEFINED CLI 1 | 2000 | 20% |
| + UNDEFINED CLI 1 #1 | 998 | 9.98% |
| - UNDEFINED CLI 1 #2 | 2 | 0.02% |
| CALL FLOW DATA – (UE: 464) | 1 | 0.01% |
| CALL FLOW DATA – (UE: 763) | 1 | 0.01% |

METHODS, SYSTEMS, AND COMPUTER READABLE MEDIA FOR CALL FLOW ANALYSIS USING COMPARISON LEVEL INDICATORS

PRIORITY CLAIM

This application claims the benefit of U.S. Provisional Patent Application Ser. No. 61/903,925 filed Nov. 13, 2013; the disclosure of which is incorporated herein by reference in its entirety.

TECHNICAL FIELD

The subject matter described herein relates to testing devices. More specifically, the subject matter relates to methods, systems, and computer readable media for call flow analysis using comparison level indicators.

BACKGROUND

When testing various devices, it is important to make sure that test results are informative and useful. For example, when testing long term evolution (LTE) networks and/or related equipment, it may be necessary to emulate a number of user devices for testing one or more devices under testing (DUTs) and to analyze the corresponding test data. Conventional testing platforms may provide statistics indicating the success or failure of a number of communications. However, such information may not be useful in diagnosing problems in software or hardware configurations or other issues. Moreover, since an amount of test data may grow linearly or even exponentially as a number of emulated devices increases, it is important for test operators to easily analyze call flow information regardless of the amount of test data.

Accordingly, in light of these difficulties, a need exists for improved methods, systems, and computer readable media for call flow analysis using comparison level indicators.

SUMMARY

Methods, systems, and computer readable media for call flow analysis using comparison level indicators (CLIs) are disclosed. One exemplary method includes emulating a plurality of user devices, transmitting test traffic to at least one device under test (DUT) using the emulated user devices, receiving traffic from the at least one DUT in response to the traffic transmitted by the emulated user devices, and analyzing the traffic received from the at least one DUT using one or more CLIs, wherein each CLI indicates particular information associated with the traffic to analyze or compare.

One exemplary system includes a user device emulator configured to emulate at least one user device and to transmit test traffic to at least one DUT (DUT), a communications interface configured to receive traffic from the at least one DUT in response to the traffic transmitted by the emulated user devices, and a traffic analyzer configured to analyze the traffic received from the at least one DUT using one or more CLIs, wherein each CLI indicates particular information associated with the traffic to analyze or compare.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 2 is a diagram illustrating exemplary call flow analysis data according to an embodiment of the subject matter described herein;

DETAILED DESCRIPTION

Figure 1:
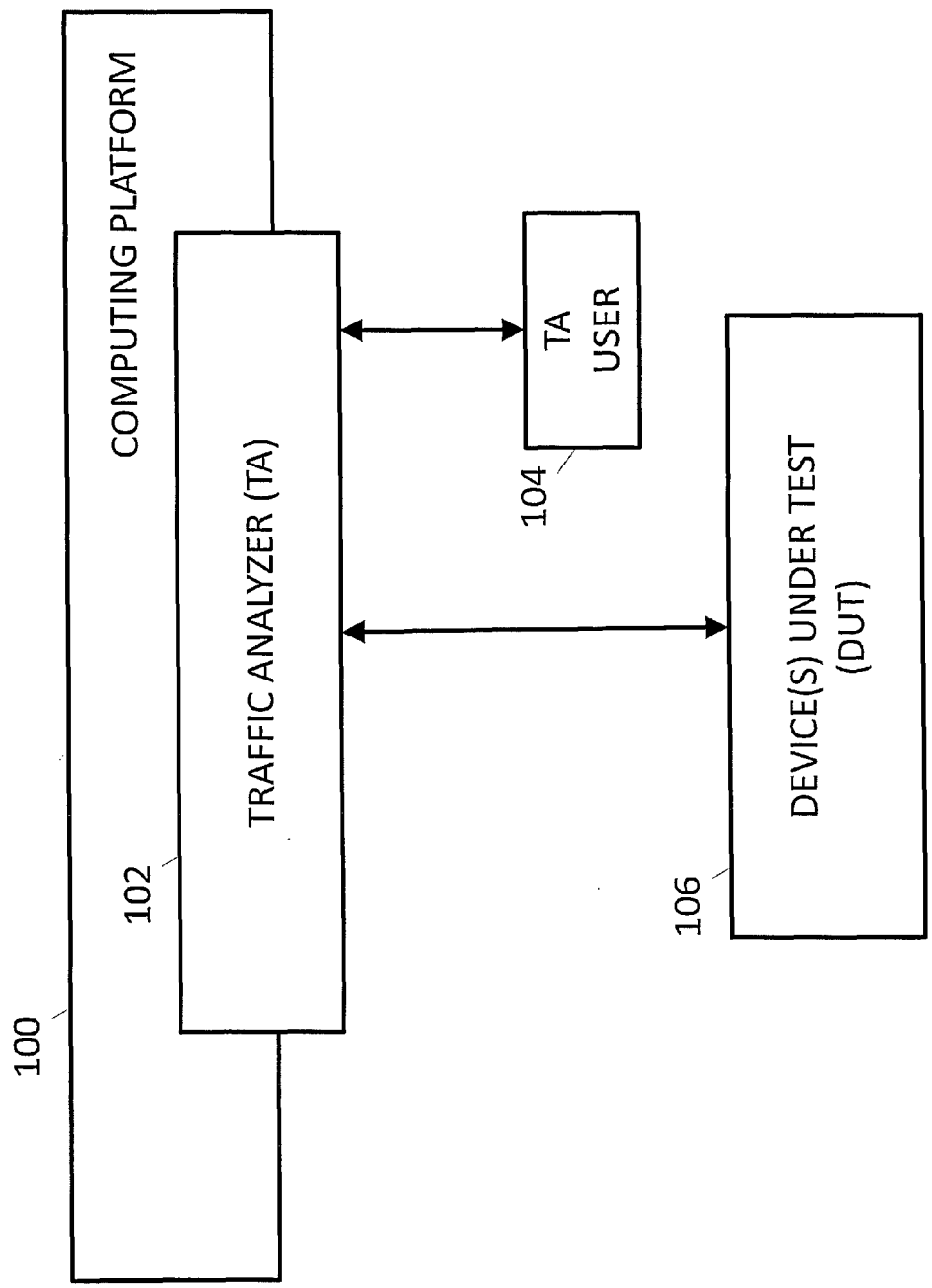
FIG. 1 is a diagram illustrating an exemplary computing platform for call flow analysis using comparison level indicators (CLIs) according to an embodiment of the subject matter described herein.

The subject matter described herein includes methods, systems, and computer readable media for call flow analysis using comparison level indicators (CLIs). Generally, device and network testers, such as carriers and equipment manufacturers, may test various devices and/or networks by simulating or emulating a realistic workload, e.g., emulating thousands of long term evolution (LTE) user devices. During a given test, the emulated UEs may perform different activities at different times, e.g., attaching with different levels of security, performing handovers, and some may experience problems, such as unexpected call drops. While convention testing platforms may provide statistics for indicating global scale successes or failures associated with testing, conventional testing platforms typically fail to provide useful and easily discernible information regarding individual call flows or user devices. For example, in a test involving 10,000 user devices, a particular user device may perform a handover but its associated call flow may be abnormal, e.g., due to a lost message or an incorrect message. In this example, the error related to the abnormal call flow may not be obvious from the statistics provided by a conventional testing platform but may be relevant to a tester because, in a live network, the error could cause a user to have a poor quality of experience (QoE) or other problems.

In accordance with some aspects of the subject matter described herein, a test operator (e.g., a human user or an automated computing platform) may define or specify one or more call flow templates, also referred to as test call flow (TCF) templates. A TCF template may include information for indicating various aspects (e.g., call flow attributes or message attributes) of an ideal or expected call flow. For example, a TCF template may define a potential call flow by indicating particular egress messages that an emulated user device may send and may also indicate corresponding ingress messages (e.g., messages that an emulated user device should or may receive in response to one or more egress messages). Using a TCF template, corresponding test traffic may be generated and/or corresponding test data may be monitored and analyzed. For example, a call flow analyzer may compare an actual test call flow with a TCF template. By comparing an actual test call flow with an expected call flow indicated in a TCF template, test result information may be collected, sorted, and/or organized to provide useful feedback, e.g., by indicating deviations from the expected call flow such that a test operator may understand or identify any problems that occurred.

In accordance with some aspects of the subject matter described herein, a test operator (e.g., a human user or an automated computing platform) may define or specify one or more CLIs. A CLI may be an indicator for indicating particular information associated with a call flow that is useful for comparison or analysis purposes. Exemplary CLIs may be associated with call flow attributes, such as messages and message attributes (e.g., a message type, an existence of a message parameter, a message parameter value, an attribute value pair, and/or delay or latency information). For example, a test operator may assign a CLI of 1 to expected message type values for certain expected (e.g., ingress or egress) messages indicated in a TCF template. In this example, a call flow analyzer may use the CLI value to compare the message types of actual messages in a call flow to the expected message types of the expected messages indicted by TCF template. In another example, a test operator may assign a CLI of 2 to a parameter field value (e.g., a subscriber identifier field value) in an expected attach request message indicated in a TCF template. In this example, a call flow analyzer may use the CLI to compare the parameter field value of an actual attach request message in a call flow to the expected parameter field value indicted by TCF template. By comparing particular data from an actual call flow with particular data from an expected call flow, where the particular data being compared is indicated in one or more CLIs, test result information may be collected, sorted, and/or organized to provide useful feedback, e.g., by filtering the call flow information during analysis to indicate discrepancies among certain defined attributes.

In accordance with some aspects of the subject matter described herein, a TCF template and/or a CLI may be defined or specified dynamically. For example, after performing one or more tests involving emulated user devices, a number of non-conforming or non-matching call flows (e.g., as compared to an existing TCF template) may be identified. Using information associated with the non-matching call flows and/or additional input from a test operator, additional TCF templates may be defined based on the non-conforming or non-matching call flows. In another example, one or more CLIs may be defined or specified based on messages indicated in a TCF template or associated with an actual call flow, e.g., certain messages or message attributes may be associated with particular CLIs based on historical information, previous testing scenarios.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an exemplary computing platform 100 for call flow analysis using CLIs according to an embodiment of the subject matter described herein. Computing platform 100 may represent any suitable entity or entities (e.g., a testing platform or a server farm) for performing aspects related to call flow analysis. In some embodiments, computing platform 100 may be configured to perform one or more aspects associated with testing a network, a system under test (SUT), at least one device under test (DUT) 106, or components of computing platform 100. For example, computing platform 100 may perform testing associated with evolved node B (eNB) or other long term evolution (LTE) network equipment, where a 1000 concurrent emulated users attempt to attach to a network and request data services. In this example, computing platform 100 may concurrently emulate multiple user devices that communicate with DUT 106.

In some embodiments, computing platform 100 may be a stand-alone tool, a testing device, or software executing on a processor. In some embodiments, computing platform 100 may be a single node or may be distributed across multiple computing platforms or nodes.

In some embodiments, computing platform 100 may be integrated or co-located with a user device emulator, also referred to as a user equipment (UE) simulator. The user device emulator may include functionality for simulating or emulating one or more 3GPP (e.g., LTE or LTE-advanced) user devices or other user devices, e.g., sending communications, receiving communications, and/or testing communications capabilities of various nodes or components. For example, computing platform 100 may be configured to generate control plane commands that trigger establishment of one or more tunnels for numerous emulated user devices to communicate with a packet data network, such as the Internet.

In some embodiments, computing platform 100 may simulate or emulate one or more evolved packet core (EPC) nodes. For example, computing platform 100 may emulate a mobility management entity (MME) and/or a home subscriber server (HSS). In some embodiments, the emulated EPC node(s) may interact with other emulated entities (e.g., emulated user devices) and/or one or more DUTs, such as an eNB.

Computing platform 100 may include one or more port modules. A port module may be any suitable entity or entities (e.g., an ASIC, a FPGA, and/or software executing on a processor) for receiving data, transmitting data, and/or processing data. For example, a port module may comprise an Xcellon-Ultra™ card manufactured by IXIA® or a portion therein (e.g., a physical port with a dedicated processor and memory) and may be configured to simulate or emulate packets associated with various nodes or UEs. In this example, each port module may comprise a different portion (e.g., a separate physical port and associated resources) of the Xcellon-Ultra™ card or may be associated with a different Xcellon-Ultra™ card.

In some embodiments, port modules may include at least one processor, memory, and/or one or more network interface cards (NICs). The NICs may receive data from or transmit data to a DUT or another port module via one or more physical ports, communications interfaces, or connections. In some embodiments, port modules may include functionality for communicating using a common public radio interface (CPRI) protocol or other protocols. For example, a CPRI interface and/or link may provide data from a radio head to port modules and vice versa.

Computing platform 100 may include a traffic analyzer (TA) 102. TA 102 may be any suitable entity or entities (e.g., an ASIC, a FPGA, and/or software executing on a processor) for performing one or more aspects associated with call flow analysis. TA 102 may include functionality for defining or specifying one or more TCF templates. For example, TA 102 may provide a communications interface, such as a user interface, for allowing a test operator (e.g., a human user or a computing platform) to define a sequence of one or more messages associated with a test call flow. In another example, TA 102 may use a communications interface or other mechanism for reading and/or parsing stored files. In this example, the database or files may contain a known or predefined call flow (e.g., from previously executed tests) and/or a TCF template.

In some embodiments, a TCF template may represent a success or failure case that a test operator (e.g., TA user 104) may be interested in observing or analyzing. For example, a TCF template may indicate a sequence of expected messages for one or more protocol layers. In this example, the TCF template may also define variable (e.g., optional or alternate) attributes, e.g., control or data elements or parameters associated with the expected messages. In some embodiments, a TCF template may include one or more variable messages or attributes in the same TCF template. In some embodiments, each variation of a call flow or a message therein may be stored as a distinct or separate TCF template.

TA 102 may include functionality for defining or specifying one or more CLIs. For example, TA 102 may provide a communications interface, such as a user interface, for allowing a test operator (e.g., a human user or a computing platform) to define call flow attributes (e.g., messages, messages attributes, message parameters, AVPs, information, elements, and/or inter-message delays) that are relevant for testing or analysis purposes, e.g., attributes that should be compared or analyzed with regards to expected values and real values. In another example, TA 102 may use a communications interface or other mechanism for reading and/or parsing stored files. In this example, the database or files may contain previously defined CLIs.

In some embodiments, CLIs may also be associated with TCF metadata or call flow attributes. For example, a CLI may be assigned to a single call flow attribute or a tuple (e.g., a set) of call flow attributes defined in a TCF template. In this example, TA 102 may use one or more CLIs to filter (e.g., include or exclude from consideration) certain test data during call flow analysis.

In some embodiments, a TCF template may specify expected egress and ingress traffic along with associated CLI values and may also be configured to handle unexpected or additional traffic. For example, a TCF template may be associated with default values such that when an additional or unexpected message is received the message may be associated with a pre-determined or dynamically determined CLI. In this example, TA 102 may determine an unexpected message to be a known type of message containing known parameter or fields and may associate the message or certain parameters with one or more CLIs based on historical information (e.g., previous test data or analysis) or default values associated with the TCF template.

In some embodiments, unexpected or additional traffic may be excluded during analysis unless directed otherwise by TA user 104. For example, test data may be compared against the expected values specified in the TCF template where the comparison excludes the additional unexpected messages, such as message re-transmissions.

In some embodiments, CLIs may be used to group, analyze, and/or compare one or more call flow attributes. For example, a CLI of 1 may be usable to group and/or compare message types of a call flow, a CLI of 2 may be usable to group and/or compare parameters associated with a first protocol layer, a CLI of 3 may be usable to group and/or compare parameters associated with a second protocol layer, and a CLI of 4 may be usable to group and/or compare latency or delay between messages of a call flow.

In some embodiments, latency attributes and/or related CLIs may be defined or specified for egress and/or ingress messages. For example, a latency attribute for an ingress message may be determined based on the time elapsed between an egress message and a corresponding ingress message being received. In another example, a latency attribute for an egress message may be usable for directing an emulated user device to wait until a specified time period has elapsed before sending the egress message.

In some embodiments, CLIs may be used to organize and/or display test result information in a hierarchical or orderly manner. For example, a first CLI may encompass a group of call flow attributes, a second CLI may encompass a subset of the group of call flow attributes, and a third CLI may encompass a subset of the subset of the group of call flow attributes. In this example, TA 102 may provide test result information in a graphical tree view, where a user may select a level of granularity based on a CLI for viewing certain test result information.

TA 102, computing platform 100, and/or another entity (e.g., a user device emulator) may include functionality for emulating user devices and/or for generating test traffic. For example, computing platform 100 may utilize a TCF template to generate one or more egress messages and may also respond to corresponding ingress messages as indicated in the TCF template.

TA 102 may include functionality for receiving call flow information. For example, TA 102 may be configured to monitor messages exchanged between peer entities in a network stack for one or more emulated user devices. In this example, TA 102, computing platform 100, or another entity may include functionality for emulating user devices, such that the user devices may communicate with DUT 106 and provide call flow information. In another example, TA 102 may include a communications interface configured to receive call information (e.g., a call log file) from an entity (e.g., a database or storage device) or node (e.g., a management system or a logging device).

TA 102 may include functionality for analyzing call flow information, e.g., information about one or more call flows associated with one or more emulated user devices. In some embodiments, TA 102 may be configured to analyze call flow information (e.g., multiple call flow logs) using one or more TCF templates and/or one or more CLIs. For example, TA 102 may generate test result information that analyzes call flow information associated with a plurality of emulated user devices in relation to one or more TCF templates. In this example, the test result information may indicate call flows that match the one or more TCF templates and/or may indicate call flows that do not match the one or more TCF templates. In another example, TA 102 may generate test result information that analyzes call flow information associated with a plurality of emulated user devices in relation to one or more CLIs. In this example, the test result information may indicate call flows that include attributes that match data indicated by the one or more CLIs and/or may indicate call flows that do not include attributes that match data indicated by the one or more CLIs.

In some embodiments, TA 102 may be integrated with a testing device or platform. The testing platform may be configured to send a variety of communications using various protocols for testing DUT 106. TA 106 may be configured to receive, monitor, and/or store traffic related data received from or provided to the testing platform and may use the traffic related data for analysis purposes.

In some embodiments, TA 102 may include or access data storage containing information related to call flow analysis. For example, TA 102 may access a data storage containing TCF templates and CLIs. Exemplary data storage may include non-transitory computer readable media, such as flash memory, random access memory, or other storage devices. In some embodiments, data storage may be external to and/or or integrated with computer platform 100 and/or TA 102.

In some embodiments, TA 102 may include one or more communications interfaces for interacting with users and/or nodes. For example, TA 102 may provide a communications interface for communicating with TA user 104. In some embodiments, TA user 104 may be an automated system or may be controlled or controllable by a human user. TA user 104 may define TCF template(s), CLI(s), and/or provide call flow information to TA 102 and may request test result information from TA 102.

In some embodiments, TA 102 and/or computing platform 100 may include one or more communications interfaces for interacting with one or more devices under test (DUT) 106. DUT 106 may be any suitable entity or entities (e.g., storage devices or filers) implementing, accessing, or otherwise using a workload or workload-related objects. For example, DUT 106 may be an evolved node B (eNB) or other evolved packet core (EPC) node associated with an LTE network. DUT 106 may communicate with one or more emulated user devices associated with TA 102 and/or computing platform 100. For example, computing platform 100 may be configured to emulate 1000 user devices that communicate with DUT 106. In this example, DUT 106 may respond by sending response messages to TA 102 and/or computing platform 100 for analysis.

In some embodiments, TA user 104 may be one or more devices under testing (DUTs). For example, DUT 106 may be any suitable entity or entities (e.g., LTE network equipment) for providing or receiving information associated with a testing scenario. In this example, DUT 106 may define TCF template(s), CLI(s), and/or provide call flow information to TA 102 and may request test result information from TA 102.

FIG. 2 is a diagram illustrating exemplary call flow analysis data 200 according to an embodiment of the subject matter described herein. Call flow analysis data 200 may include any information, such as TCF templates, template metadata, call flow attributes, and/or CLIs, usable for performing aspects of call flow analysis. In some embodiments, call flow analysis data 200 may be stored in a non-transitory computer readable medium (e.g., a storage device or memory) accessible to TA 102, computer platform 100, or another node or module.

In some embodiments, call flow analysis data 200 may represent a TCF template, or a portion thereof, that includes various call flow attributes, such as a sequence of messages, message parameters, inter-message latency, response time latency, unexpected or unsolicited ingress messages, and/or other information.

In some embodiments, call flow analysis data 200 may be provided and/or displayed (e.g., by TA 102 or computing platform 100) via various user interfaces. For example, call flow analysis data 200 may be displayed using a table or grid format. In another example, call flow analysis data 200 or an associated template may be displayed using a graphical tree view or outline view, where a user may define or view call flow attributes and/or sub-attributes by expanding or collapsing portions of a hierarchal view of attribute information.

Referring to FIG. 2, call flow analysis data 200 may include TCF template information indicating a sequence of five messages, including four egress messages and one ingress message. A first message (e.g., test sequence ID: 1) may be a radio resource control (RRC) connection request message for requesting radio resources to connect to an eNB. The RRC connection request may be an egress message and may be associated with three CLIs. In particular, a CLI of 1 may be associated with a message type or operator code attribute associated with the RRC connection request message, where the attribute may have an expected value of "X". A CLI of 2 may be associated with a parameter "A-1" associated with the RRC connection request message, where the parameter may have an expected value of "Y". A CLI of 3 may be associated with a group of parameters, such as "A-2", "A-4", and A-6", associated with the RRC connection request message, where the parameters may have an expected value of "R", "J", and "L", respectively.

A second message (e.g., test sequence ID: 2) may be a RRC connection setup message for setting up radio resources and providing information usable for connecting to an eNB. The RRC connection setup message may be an ingress message (from an eNB) and may be associated with two CLIs. In particular, a CLI of 1 may be associated with a message type or operator code attribute associated with the RRC connection setup message, where the attribute may have an expected value of "Z". A CLI of 2 may be associated with a latency "B" associated with the RRC connection setup message, where the latency may have an expected value of less than or equal to "E" (e.g., ten seconds).

A third message (e.g., test sequence ID: 3) may be a RRC connection setup complete message for completing radio control connection setup. The RRC connection setup complete message may be an egress message and may be associated with three CLIs. In particular, a CLI of 1 may be associated with a message type or operator code attribute associated with the RRC connection setup complete message, where the attribute may have an expected value of "AA". A CLI of 2 may be associated with a parameter "C-1" associated with the RRC connection setup complete message, where the parameter may have an expected value of "ZZ". A CLI of 3 may be associated with a group of parameters, such as "C-3" and "C-5", associated with the RRC connection setup complete message, where the parameters may have an expected value of "NN" and "UU", respectively.

A fourth message (e.g., test sequence ID: 4) may be an attach message for attaching to a mobile network. The attach message may be an egress message and may be associated with three CLIs. In particular, a CLI of 1 may be associated with a message type or operator code attribute associated with the attach message, where the attribute may have an expected value of "BB". A CLI of 2 may be associated with the existence of parameter "D-1" associated with the attach message, where the parameter is expected to exist or be present in the attach message, represented by a Boolean value of "TRUE". A CLI of 3 may be associated with a value of parameter "D-1" associated with the attach message, where the parameter may have an expected value of "QQQ".

A fifth message (e.g., test sequence ID: 5) may be a PDN connectivity request message for requesting connectivity to a packet data network (e.g., the Internet). The PDN connectivity request message may be an egress message and may be associated with two CLIs. In particular, a CLI of 1 may be associated with a message type or operator code attribute associated with the PDN connectivity request message, where the attribute may have an expected value of "CC". A CLI of 2 may be associated with the existence of parameter "D-1" associated with the PDN connectivity request message, where the parameter is expected to not exist or not be present in the PDN connectivity request message, represented by a Boolean value of "FALSE".

It will be appreciated that call flow analysis data 200 depicted in FIG. 2 is illustrative, and different and/or additional information may be used for performing call flow analysis or aspects therein.

Figure 3:
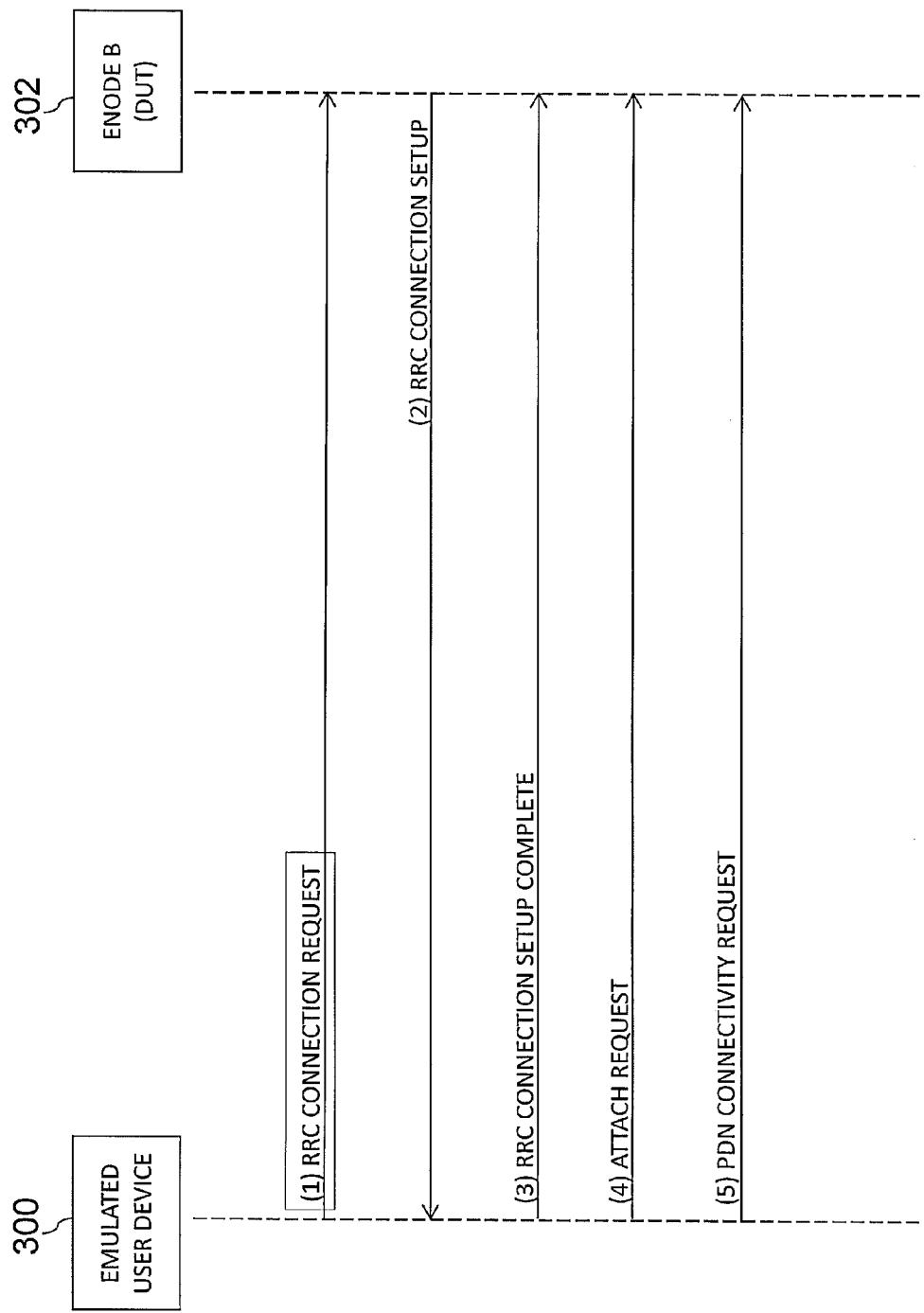
FIG. 3 is a diagram illustrating an exemplary call flow portion according to an embodiment of the subject matter described herein.

FIG. 3 is a diagram illustrating an exemplary call flow portion according to an embodiment of the subject matter described herein. The exemplary call portion may be between an emulated user device 300 and an eNB 302 or other EPC network node. In some embodiments, emulated user device 300 may be controlled or implemented by computing platform 100 or a related module. For example, computing platform 100 or a user device emulator may utilize emulated user device 300 for testing one or more aspects of eNB 302, by initiating an attach procedure for attaching to an LTE network that eNB 302 is serving.

In some embodiments, call flow analysis data 200 may be used by computing platform 100, TA 102, or another module or node to test one or more DUTs, such as DUT 106. For example, during testing, computing platform 100 may emulate 1000 user devices and may generate test traffic for each emulated user device, e.g., by sending one or more egress messages indicated in a TCF template. Computing platform 100 may also receive and respond to ingress messages (e.g., messages sent from DUT 106) using exemplary call analysis data 200. For example, a TCF template may indicate or define ingress messages (and associated parameter values) that are expected to be received in response to sent egress messages and may specify or define alternate ingress messages (and associated parameter values) that may be received if certain errors or error conditions exist. In this example, computer platform 100 may attempt to send an appropriate egress message (e.g., if indicated in the TCF template) based on a received ingress message.

Referring to FIG. 3, the exemplary call flow portion may represent emulated user device 300 initiating an attach procedure for attaching to an LTE network that eNB 302 is serving. At step 1, an RRC connection request message may be sent from emulated user device 300 to eNB 302. The RRC connection request message may include a user device identifier and a request or establishment cause and may request radio resources information from eNB 302, e.g., via an LTE Uu interface or an air interface.

At step 2, an RRC connection setup message may be sent from eNB 302 to emulated user device 300. The RRC connection setup message may provide radio resources information, such as configuration information about a signaling radio bearer, to emulated user device 300, e.g., via an LTE Uu interface or an air interface.

At step 3, an RRC connection setup complete message may be sent from emulated user device 300 to eNB 302. The RRC connection setup complete message may complete a radio control connection setup procedure and may include an RRC transaction identifier, a network identifier, MME information, and/or NAS information.

At step 4, an attach request message may be sent from emulated user device 300 to eNB 302. The attach request may initiate an attach procedure for attaching to a mobile network.

At step 5, a PDN connectivity request message may be sent from emulated user device 300 to eNB 302. The PDN connectivity request message may request setup of an evolved packet system (EPS) bearer for communicating with a packet data network (e.g., the Internet).

It will be appreciated that the call flow portion depicted in FIG. 3 is illustrative, and different and/or additional messages and/or information may be used for performing call flow analysis or aspects therein. For example, additional messages may be sent to or received from emulated user device 300, eNB 302, and/or other network nodes to complete an attach procedure and provide PDN connectivity, e.g., access to the Internet.

Figure 4:
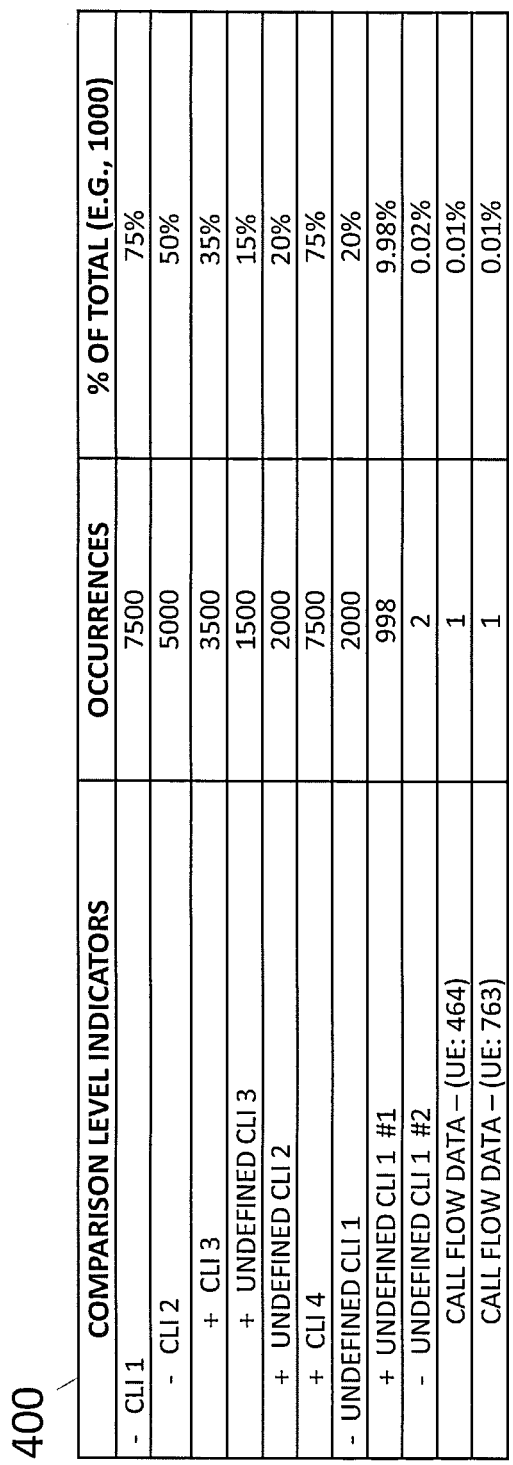
FIG. 4 is a diagram illustrating exemplary test result information according to an embodiment of the subject matter described herein.

FIG. 4 is a diagram illustrating exemplary test result information 400 according to an embodiment of the subject matter described herein. In some embodiments, test result information 400 may include information derived or determined using call flow information associated with one or more TCF templates and/or one or more CLIs.

In some embodiments, test result information 400 may be derived, determined, and/or provided by TA 102 or another module or node. Test result information 400 may include information determined during one or more tests involving one or more emulated user devices. For example, test result information 400 may include statistics and other analysis associated with test data, such as call flow logs associated with one or more emulated user devices during a testing period.

In some embodiments, TA 102 or another module or node may be configured to provide or display test result information 400 via one or more user interfaces. For example, test result information 400 may be displayed using a graphical outline view, where test result information 400 may be dynamically filtered and/or compared to expected test results based, at least in part, on CLIs specified in a TCF template.

In some embodiments, a graphical user interface may display test result information 400 in a hierarchical manner. For example, an outline view may display information (e.g., call flow attributes) associated with a CLI of 1 as a top level or a root level, while subsequent CLIs may be child levels or branch levels and/or sub-child levels or sub-branch levels. As such, TA user 104 may easily control, e.g., in a hierarchical manner, the depth and/or detail of test result information 400, e.g., by using CLIs for specifying which call flow attributes are to be included in (or excluded from) the comparative analysis involving one or more TCF templates. Hence, an outline view can display test result information 400 associated with each CLI or a combinations of CLIs specified in a TCF template.

Referring to FIG. 4, test result information 400 may include summary information and/or statistics associated with multiple CLIs and/or may include summary information and/or statistics associated with non-conforming or non-matching attributes identified by CLIs. For example, an outline view may include a "CLI 1" interface element. The "CLI 1" interface element may indicate summary statistics for call flows having attributes associated with a CLI of "1", such as a percentage of total emulated user devices that completed a test with all expected messages (e.g., as indicated in a TCF template) successfully sent or received. The "CLI 1" interface element may also include or expand to show child levels of information and related interface elements, such as a "CLI 2" interface element and related summary statistics and a "CLI 3" interface element and related summary statistics. For example, a "CLI 2" interface element may indicate a percentage of total emulated user devices that completed a test with all expected messages (e.g., as indicated in a TCF template) successfully sent or received and having expected attribute values for the attributes defined in the TCF template as being associated with a CLI of "2".

In some embodiments, test result information 400 may include summary statistics for call flows not having attributes associated with CLIs. For example, an "UNDEFINED CLI 1" interface element may indicate a percentage of total emulated user devices that completed a test with some (but not all) expected messages (e.g., as indicated in a TCF template) successfully sent or received. The "UNDEFINED CLI 1" interface element may also include or expand to show groups of non-conforming call flows and/or particular non-conforming call flows, along with their related summary statistics.

In some embodiments, test result information 400 may be useful for identifying unexpected call flows or message sequences. For example, during testing involving 10,000 user devices, if 188 failures occurred but only two non-matching call flow patterns occurred (e.g., UNDEFINED CLI 1 #1 and UNDEFINED CLI 1 #2), the two non-matching call flow patterns may be further investigated, such as by examining call flow data for a particular user device. In some embodiments, after investigating a non-matching call flow, a TCF template may be generated based on the non-matching call flow and added to a relevant database so as to be usable with future tests.

In some embodiments, test result information 400 may include additional analysis information, such as charts and graphs. For example, call flow attributes usable for monitoring or analyzing system performance may be specified or defined in a TCF template. In this example, latency and message arrival or delivery rates may be associated with one or more CLIs in the TCF template, TA 102 may analyze test data to provide system performance feedback, such as a graph indicating latency for each scenario with respect to number of user devices, throughput, and/or other factors, thereby allowing TA user 104 to visually identify degradation points or thresholds.

Figure 5:
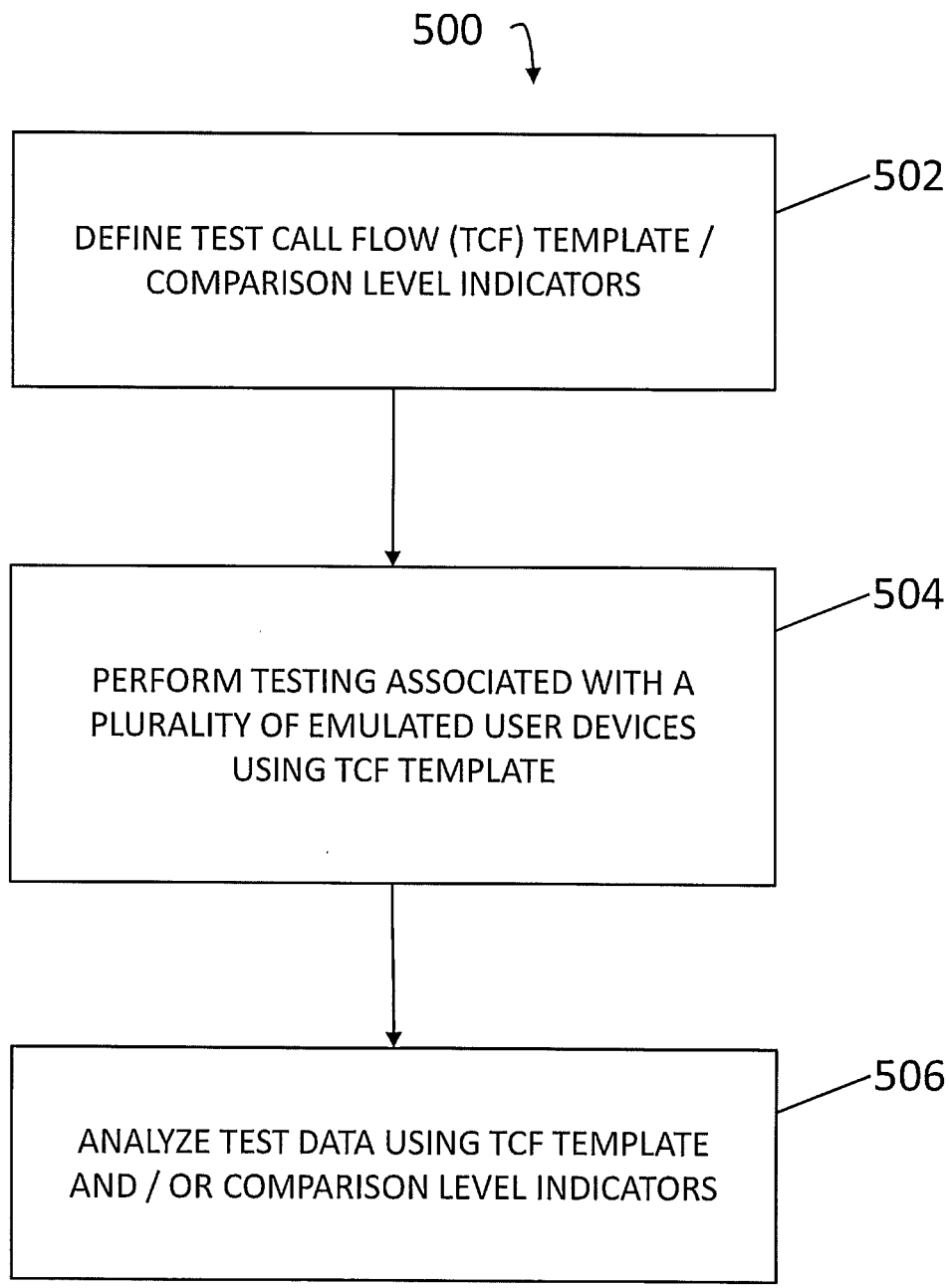
FIG. 5 is a diagram illustrating an exemplary process for testing a device under test (DUT) according to an embodiment of the subject matter described herein.

FIG. 5 is a diagram illustrating an exemplary process 500 for call flow analysis using CLIs according to an embodiment of the subject matter described herein. In some embodiments, exemplary process 500, or portions thereof, may be performed by or at computing platform 100, TA 102, TA user 104, DUT 106, and/or another node or module. In some embodiments, exemplary process 500 may include steps 502, 504, and/or 506.

At step 502, a TCF template and/or one or more CLIs may be defined. For example, TA user 104 may provide a TCF template that indicates certain egress messages to be sent to DUT 106 and may also indicate one or more possible ingress messages to be received from DUT 106 or another entity. In this example, the TCF template may also include CLIs that indicate certain attributes (e.g., message parameters and/or latency or delay information) associated with a TCF which may be compared or analyzed, e.g., actual values of certain attributes may be compared to expected values provided in the TCF template.

At step 504, testing associated with a plurality of user devices may be performed using the TCF template. For example, computer platform 100 may emulate 1000 user devices, where each emulated user device may generate an egress message indicated in a TCF template. In this example, each emulated device may receive a corresponding ingress message and respond or attempt to respond using a subsequent egress message indicated in the TCF template. Computer platform 100 or a related module may store or maintain test data for each emulated user device.

At step 506, the test data may be analyzed using the TCF template and/or one or more CLIs. For example, TA 102 may receive test data (e.g., a call flow record indicating ingress and egress messages received during a call flow or session and/or related information) associated with each emulated user device. Using the TCF template and/or one or more CLIs to identify and/or compare certain portions of the test data, TA 102 may analyze the test data such that a test operator can sort and/or filter the test data in useful and varied ways, such as indicating to a user the number of call flows where certain actual values match expected values of attributes associated with CLIs.

Figure 6:
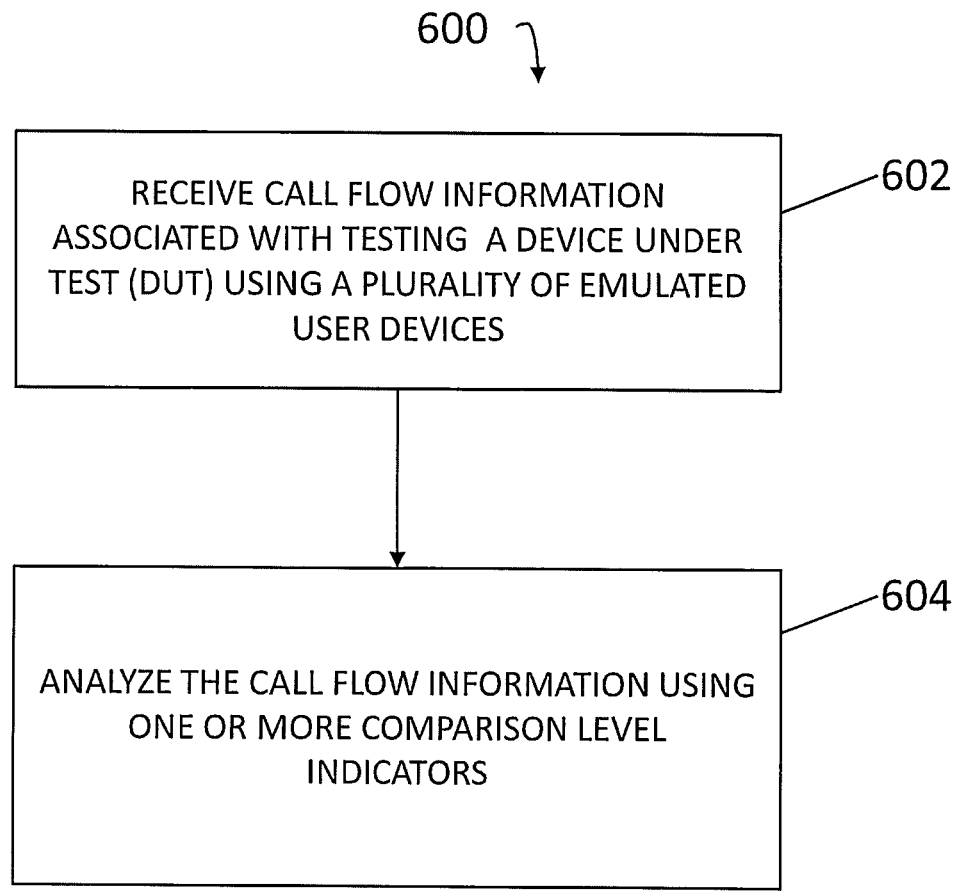
FIG. 6 is a diagram illustrating an exemplary process for call flow analysis using CLIs according to an embodiment of the subject matter described herein.

FIG. 6 is a diagram illustrating an exemplary process 600 for call flow analysis using CLIs according to an embodiment of the subject matter described herein. In some embodiments, exemplary process 600, or portions thereof, may be performed by or at computing platform 100, TA 102, and/or another node or module. In some embodiments, exemplary process 600 may include steps 602 and/or 604.

At step 602, call flow information associated with testing DUT 106 using a plurality of emulated user devices may be received. For example, a communications interface associated with TA 102 may be configured to copy ingress and egress messages, or portions thereof, associated with a plurality of emulated user devices during testing of DUT 106. In another example, a communications interface associated with TA 102 may be configured to receive stored call flow information from a node or other entity, e.g., reading information from stored test data files.

At step 604, the call flow information may be analyzed using one or more CLIs. For example, CLIs may be used to identify relevant data in the call flow information and may be organized such that a test operator can display the relevant data in an organized (e.g., hierarchal) manner. In some embodiments, one or more CLIs may be used in filtering the call flow information during analysis.

In some embodiments, one or more CLIs may include information about message attribute information, an attribute value pair (AVP), a message parameter, an information element, a message type, a message sequence, an unexpected or unsolicited ingress message, a protocol layer, inter-message latency, response time latency, and/or a delay associated with a message.

In some embodiments, one or more CLIs may be defined in a call flow template prior to testing DUT 106 using a plurality of emulated user devices.

In some embodiments, a call flow template may be used in generating test traffic associated with a plurality of emulated user devices.

In some embodiments, a call flow template may indicate one or more egress messages associated with a plurality of emulated user devices and indicates one or more expected ingress messages associated with DUT 106.

In some embodiments, a call flow template may be determined dynamically, e.g., based on historical call flow information or received call flow information.

In some embodiments, analyzing call flow information using one or more CLIs may include generating test result information that compares a call flow template and a portion of the call flow information, wherein the portion of the call flow information is determined using the one or more CLIs.

In some embodiments, analyzing call flow information using one or more CLIs may include generating test result information that indicates an amount of compliance between a portion of the call flow information and a call flow template, wherein the portion of the call flow information is determined using the one or more CLIs.

In some embodiments, one or more CLIs may be determined dynamically, e.g., based on historical call flow information or received call flow information.

Figure 7:
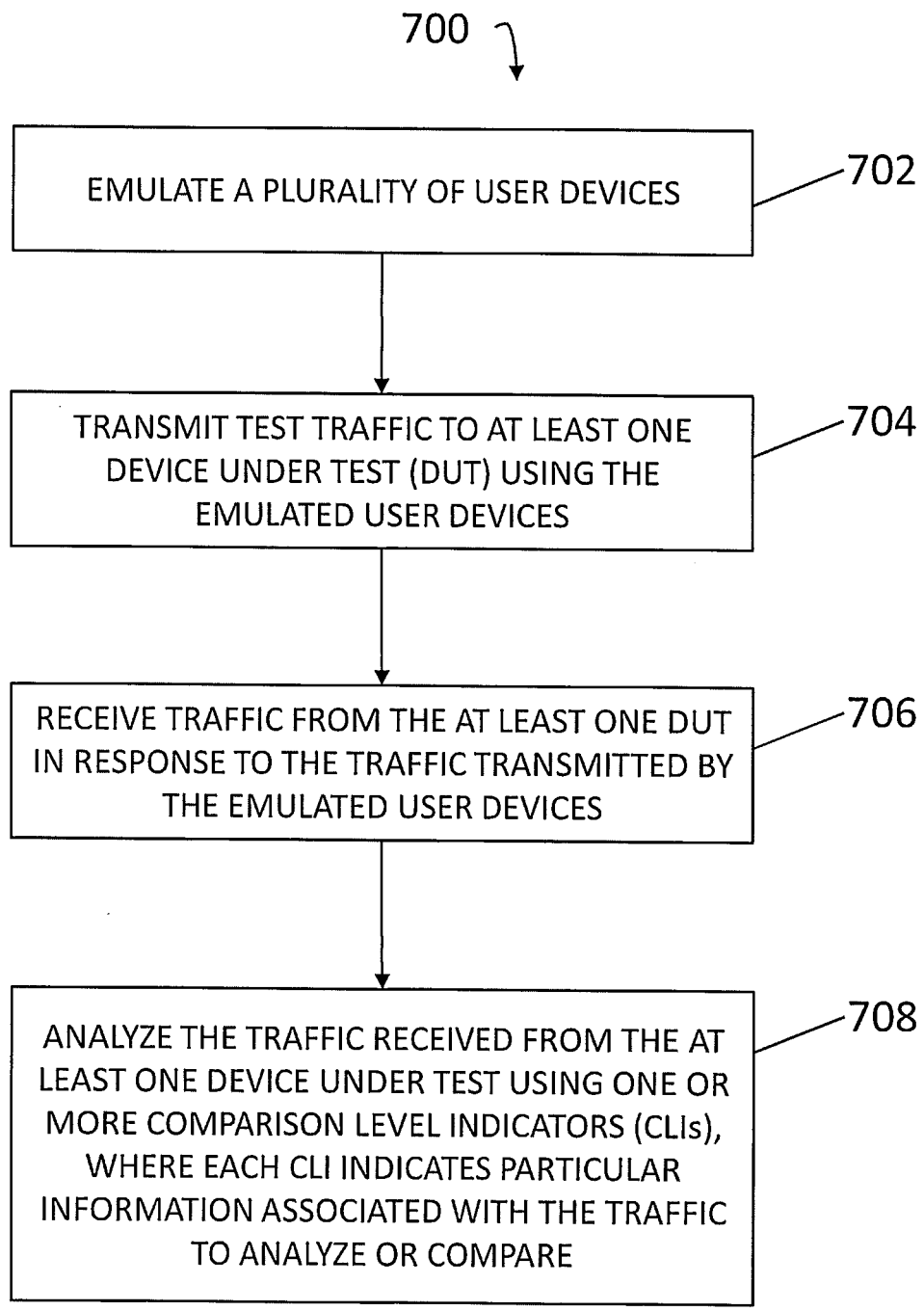
FIG. 7 is a diagram illustrating another exemplary process for call flow analysis using CLIs according to an embodiment of the subject matter described herein.

FIG. 7 is a diagram illustrating another exemplary process 700 for call flow analysis using comparison level indicators according to an embodiment of the subject matter described herein. In some embodiments, exemplary process 700, or portions thereof, may be performed by or at computing platform 100, TA 102, and/or another node or module. In some embodiments, exemplary process 700 may include steps 702, 704, 706, and/or 708.

At step 702, a plurality of user devices may be emulated. For example, TA 102 or a related entity (e.g., a network equipment test device, a user device emulator, or computing platform 100) may emulate multiple user devices for testing DUT 106.

At step 704, test traffic may be transmitted to DUT 106 using the emulated user devices. For example, TA 102 or a related entity (e.g., a user device emulator) may send egress messages for emulated user devices to DUT 106.

In some embodiments, a call flow template may be used to generate test traffic transmitted by emulated user devices. For example, a call flow template may indicate one or more egress messages associated with a plurality of emulated user devices and may indicate one or more expected ingress messages associated with DUT 106.

At step 706, traffic from DUT 106 may be received in response to the traffic transmitted by the emulated user devices. For example, after an attach request message, DUT 106 may send an attach accept message (e.g., an ingress message from the perspective of an emulated user device).

At step 708, the traffic received from at least one DUT 106 using one or more CLIs. For example, CLIs may be used to identify or indicate particular data in test traffic to analyze or compare. In another example, CLIs may be usable for organizing analysis information (e.g., test results) such that a test operator can display the relevant data in an organized (e.g., hierarchal) manner.

In some embodiments, analyzing traffic received from at least one DUT 106 or other call flow information using the one or more CLIs includes filtering the traffic or call flow information using the one or more CLIs.

In some embodiments, one or more CLIs may be defined in a call flow template prior to testing DUT 106.

In some embodiments, analyzing traffic received from at least one DUT 106 other call flow information using one or more CLIs may include generating test result information that compares a call flow template and a portion of the traffic or call flow information, wherein the portion of the traffic or call flow information is determined using the one or more CLIs.

In some embodiments, analyzing traffic received from the at least one DUT 106 or other call flow information using one or more CLIs may include generating test result information that indicates an amount of compliance between a portion of the traffic or call flow information and a call flow template, wherein the portion of the traffic or call flow information is determined using the one or more CLIs.

It should be noted that computing platform 100, TA 102, and/or functionality described herein may constitute a special purpose test device. Further, computing platform 100, TA 102, and/or functionality described herein can improve the technological field of testing network devices and traffic analysis by using comparison level indicators (CLIs), TCF templates, and/or other mechanisms.

The subject matter described herein for call flow analysis using CLIs improves the functionality of testing platforms and testing in general by providing more efficient mechanisms to quickly analyze test data, such as call flows. It should also be noted that a computing platform that implements the subject matter described herein may comprise a special purpose computing device usable to analyze traffic, e.g., traffic associated with various network equipment.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for call flow analysis using comparison level indicators (CLIs), the method comprising:
at a network equipment test device:
emulating a plurality of user devices;
prior to transmitting test traffic, assigning one or more comparison level indicators (CLIs) to data portions associated with a call flow initiated by the test traffic, wherein each of the one or more CLIs indicates particular information associated with the call flow to analyze or compare, wherein at least one of the data portions includes information in a message sent from at least one device under test (DUT) after receiving the test traffic;
transmitting the test traffic to the at least one DUT using the emulated user devices;
receiving traffic from the at least one DUT in response to the traffic transmitted by the emulated user devices;
analyzing the traffic received from the at least one DUT using the one or more CLIs; and
displaying, to a user, data analysis based on the one or more CLIs.

2. The method of claim 1 wherein the one or more CLIs include information about message attribute information, an attribute value pair (AVP), a message parameter, an information element, a message type, a message sequence, an unexpected or unsolicited ingress message, a protocol layer, inter-message latency, response time latency, or a delay associated with a message.

3. The method of claim 1 wherein the one or more CLIs are assigned in a call flow template prior to testing the at least one DUT.

4. The method of claim 3 comprising using the call flow template to generate the test traffic transmitted by the plurality of emulated user devices.

5. The method of claim 1 wherein analyzing the traffic using the one or more CLIs includes filtering the traffic received from the at least one DUT using the one or more CLIs.

6. The method of claim 4 wherein the call flow template indicates one or more egress messages to be transmitted by the plurality of emulated user devices and indicates one or more ingress messages expected to be received from the at least one DUT.

7. The method of claim 3 wherein analyzing the traffic received from the at least one DUT using the one or more CLIs includes generating test result information that compares the call flow template and a portion of the traffic received from the DUT, wherein the portion of the traffic received from the DUT is determined using the one or more CLIs.

8. The method of claim 3 wherein analyzing the traffic received from the at least one DUT using one or more CLIs includes generating test result information that indicates an amount of compliance between a portion of the traffic received from the at least one DUT and the call flow template, wherein the portion of the traffic received from the at least one DUT is determined using the one or more CLIs.

9. The method of claim 1 wherein the one or more CLIs or a call flow template is determined dynamically.

10. A system for call flow analysis using comparison level indicators (CLIs), the system comprising:
   a network equipment test device comprising:
      a user device emulator configured to emulate at least one user device and to transmit test traffic to at least one device under test (DUT);
      a communications interface configured to receive traffic from the at least one DUT in response to the traffic transmitted by the emulated user devices; and
      a traffic analyzer configured to analyze the traffic received from the at least one DUT using one or more comparison level indicators (CLIs), wherein, prior to transmitting test traffic, the traffic analyzer is configured to assign the one or more CLIs to data portions associated with a call flow initiated by the test traffic, wherein each of the one or more CLIs indicates particular information associated with the call flow to analyze or compare, wherein at least one of the data portions includes information in a message sent from the at least one DUT after receiving the test traffic.

11. The system of claim 10 wherein the one or more CLIs include information about message attribute information, an attribute value pair (AVP), a message parameter, an information element, a message type, a message sequence, an unexpected or unsolicited ingress message, a protocol layer, inter-message latency, response time latency, or a delay associated with a message.

12. The system of claim 10 wherein the one or more CLIs are assigned in a call flow template prior to testing the at least one DUT.

13. The system of claim 12 wherein the traffic analyzer is configured to use the call flow template in generating the test traffic transmitted by the emulated user devices.

14. The system of claim 10 wherein the traffic analyzer is configured to use the one or more CLIs in filtering the traffic received from the at least one DUT.

15. The system of claim 13 wherein the call flow template indicates one or more egress messages to be transmitted by the emulated user devices and indicates one or more ingress message expected to be received from the at least one DUT.

16. The system of claim 12 wherein the traffic analyzer is configured to compare the call flow template and a portion of the traffic received from the at least one DUT, wherein the portion of the traffic is determined using the one or more CLIs.

17. The system of claim 12 wherein the traffic analyzer is configured to generate test result information that indicates an amount of compliance between a portion of the traffic received from the at least one DUT and the call flow template, wherein the portion of the traffic is determined using the one or more CLIs.

18. The system of claim 10 wherein the one or more CLIs or a call flow template is determined dynamically.

19. A non-transitory computer readable medium comprising computer executable instructions embodied in the computer readable medium that when executed by a processor of a computer control the computer to perform steps comprising:
   at a network equipment test device:
      emulating a plurality of user devices;
      prior to transmitting test traffic, assigning one or more comparison level indicators (CLIs) to data portions associated with a call flow initiated by the test traffic, wherein each of the one or more CLIs indicates particular information associated with the call flow to analyze or compare, wherein at least one of the data portions includes information in a message sent from at least one device under test (DUT) after receiving the test traffic;
      transmitting the test traffic to the at least one DUT using the emulated user devices;
      receiving traffic from the at least one DUT in response to the traffic transmitted by the emulated user devices;
      analyzing the traffic received from the at least one DUT using the one or more CLIs; and
      displaying, to a user, data analysis based on the one or more CLIs.

20. The non-transitory computer readable medium of claim 19 wherein the one or more CLIs include information about message attribute information, an attribute value pair (AVP), a message parameter, an information element, a message type, a message sequence, an unexpected or unsolicited ingress message, a protocol layer, inter-message latency, response time latency, or a delay associated with a message.

* * * * *